United States Patent
Shimizu et al.

[11] Patent Number: 6,007,923
[45] Date of Patent: Dec. 28, 1999

[54] TITANIUM ALLOY, MEMBER MADE OF THE TITANIUM ALLOY AND METHOD FOR PRODUCING THE TITANIUM ALLOY MEMBER

[75] Inventors: Takao Shimizu, Nagoya; Seiya Asari, Machida; Noriyoshi Yokota, Nagoya, all of Japan

[73] Assignee: Daido Tokushuko Kabushiki Kaisha, Nagoya, Japan

[21] Appl. No.: 08/659,720

[22] Filed: Jun. 6, 1996

[30] Foreign Application Priority Data

Jun. 16, 1995 [JP] Japan .................................... 7-150753
Jun. 16, 1995 [JP] Japan .................................... 7-150758
Jun. 16, 1995 [JP] Japan .................................... 7-150779

[51] Int. Cl.$^6$ .................................................. C22C 14/00
[52] U.S. Cl. ........................ 428/586; 148/421; 420/417; 420/418; 420/419; 420/420; 428/660
[58] Field of Search .................. 420/417–421; 148/407, 421; 428/586, 660

[56] References Cited

U.S. PATENT DOCUMENTS

| | | | |
|---|---|---|---|
| 4,576,660 | 3/1986 | Rowe | 420/417 |
| 4,578,129 | 3/1986 | Rowe | 420/417 |
| 4,810,465 | 3/1989 | Kimura et al. | 420/417 |
| 5,156,807 | 10/1992 | Nagata et al. | 420/417 |

FOREIGN PATENT DOCUMENTS 60-251239  12/1985  Japan .
61-250139  11/1986  Japan .

OTHER PUBLICATIONS

*ASM Handbook*, vol. 2, Properties and Selection, p. 588, ASM, 1990.

*Primary Examiner*—George Wyszomierski
*Attorney, Agent, or Firm*—Sughrue, Mion, Zinn, Macpeak & Seas, PLLC

[57] ABSTRACT

A joined tubular body comprises a titanium alloy pipe of which crystal grain is hard to coarsen at the time of welding or hot-extruding, which consists by weight percentage of at least one element selected from 0.01~10% of S, 0.01~10% of Se and 0.01~10% of Te (the total sum does not exceed 10%), one or both of 0.01~10% REM and 0.01~10% of Ca (the total sum does not exceed 10%), and the above pipe is joined to a titanium alloy pipe consisting of the above elements and also at least one element selected from $Al \leq 10\%$, $V \leq 25\%$, $Sn \leq 15\%$, $Co \leq 10\%$, $Cu \leq 10\%$, $Ta \leq 15\%$, $Mn \leq 10\%$, $Hf \leq 10\%$, $W \leq 10\%$, $Si \leq 0.5\%$, $Nb \leq 20\%$, $Zr \leq 10\%$, $Mo \leq 15\%$, and $0 \leq 0.1\%$ (the total sum does not exceed 30%).

4 Claims, 3 Drawing Sheets

TITANIUM ALLOY, MEMBER MADE OF THE TITANIUM ALLOY AND METHOD FOR PRODUCING THE TITANIUM ALLOY MEMBER

BACKGROUND OF THE INVENTION

1. Field of the Invention

This invention relates to a titanium alloy excellent in weldability or joinability as a material for various titanium alloy members such as a pipe or so used in industrial fields of aerospace, chemistry, oil well drilling and the like, and further relates to a method for producing the titanium alloy members such as the titanium alloy pipe and a joined tubular body made of the titanium alloy.

2. Description of the Prior Art

Generally, a titanium alloy is superior in strength per unit mass and excellent in corrosion resistance and the like, therefore it has been used widely in industrial fields of aeropsace, chemistry, oil well drilling and so on.

The titanium alloy or titanium alloy member is joined through various joining methods such as TIG welding (tungusten inert gas arc welding), MIG welding (metal inert gas arc welding), friction welding, electron beam welding, laser beam welding, diffusion welding, brazing and the like.

In any joining methods, however, the titanium alloy base metal adjacent to the joined zone changes its property and deteriorates in its mechanical properties owing to the thermal effect at the time of joining, and it is difficult to ensure joint strength equivalent to the strength of the base metal in most cases. Accordingly, there has been a problem in that development of a titanium alloy of which quality is not deteriorated so remarkably by the thermal effect at the time of the joining is earnestly cried for.

On the other hand, in order to further make the most use of the excellent characteristics of the titanium alloy in the aforementioned industrial fields, it is dispensable to manufacture titanium alloy pipes from the titanium alloy. However, as conventional techniques for manufacturing the titanium alloy pipes, a few methods have been merely put to practical use, such as a method of bending the titanium alloy formed in a thin sheet into an O-like shape through a U-like shape and joining a seam of the titanium alloy sheet bent in the O-like shape, and a method of forming the titanium alloy pipe directly by cutting a titanium alloy block through machining.

However, in a case of the welded pipe which is manufactured by joining the seam of the titanium alloy sheet subjected to the so-called U-O bending, there is a problem in that it is difficult to manufacture the pipe with a thick wall since there is a limit in forming of the titanium alloy sheet.

Further, there is another problem in a case of the titanium alloy pipe by machine cutting in that cost of the pipe increases because the yield rate of the titanium alloy material and the production efficiency are remarkably low, though there is large room for selecting shapes and sizes.

Furthermore, it is also indispensable to join the titanium alloy pipes with each other in order to use the titanium alloy pipes as structural members. In the case of joining the titanium alloy pipes with large diameters and thick walls through the TIG welding or so, it takes considerably much time for the welding. Besides, it becomes difficult to ensure the quality of the welded joint especially in the joining at the job site, accordingly there is another problem in that it is restricted to apply the titanium alloy pipes to large-sized structures required for the joining at the job site indispensably.

SUMMARY OF THE INVENTION

This invention has been made in view of the aforementioned problems of the prior art, it is an object to provide a titanium alloy excellent in the joinability of which quality is not deteriorated so remarkably owing to the thermal effect in the joining.

It is another object of the invention to provide a titanium alloy pipe which is excellent in surface quality and flattening test property, does not waste dies so much and is possible to be especially applied to the large-sized structures, and a method for producing such the titanium alloy pipe.

Furthermore, the other object of this invention is to provide a joined tubular body and a method for producing such the joined tubular body which are possible to improve the quality of the welded joint even in the joining at the job site and possible to be applied especially to the large-sized structures.

That is, the titanium alloy according to this invention is characterized by consisting essentially by weight percentage of not more than 10% in total sum of at least one element selected from 0.01 to 10% of S, 0.01 to 10% of Se and 0.01 to 10% of Te, not more than 10% in total sum of one or both of 0.01 to 10% of REM and 0.01 to 10% of Ca, and the remainder being substantially Ti. The titanium alloy according to this invention may be further contained with not more than 30% in total sum of at least one element selected from not more than 10% of Al, not more than 25% of V, not more than 15% of Sn, not more than 10% of Co, not more than 10% of Cu, not more than 15% of Ta, not more than 10% of Mn, not more than 10% of Hf, not more than 10% of W, not more than 0.5% of Si, not more than 20% of Nb, not more than 10% of Zr, not more than 15% of Mo and not more than 0.1% of O according to demand.

The titanium alloy pipe according to another aspect of this invention is characterized by having a composition comprising essentially by weight percentage of not more than 10% in total sum of at least one element selected from 0.01 to 10% of S, 0.01 to 10% of Se and 0.01 to 10% of Te, not more than 10% in total sum of one or both of 0.01 to 10% of REM and 0.01 to 10% of Ca, and the remainder being substantially Ti. The titanium alloy pipe according to this invention may be added with not more than 30% in total sum of at least one element selected from not more than 10% of Al, not more than 25% of V, not more than 15% of Sn, not more than 10% of Co, not more than 10% of Cu, not more than 15% of Ta, not more than 10% of Mn, not more than 10% of Hf, not more than 10% of W, not more than 0.5% of Si, not more than 20% of Nb, not more than 10% of Zr, not more than 15% of Mo and not more than 0.1% of O when necessary.

In an embodiment of the titanium alloy pipe according to this invention, the pipe may be seamless. Further, in another embodiment of the titanium alloy pipe according to this invention, it is desirable according to circumstances that the ratio (t/D) of thickness (t) to outer diameter (D) of the pipe is not less than 0.01 and not more than 0.40.

The method for producing a titanium alloy pipe according to the outer aspect of this invention is characterized by extruding a titanium alloy material having the composition according to claim 1 or 2 into a seamless tubular shape.

In an embodiment of the method for producing a titanium alloy pipe according to this invention, it is desirable according to circumstances that the ratio (t/D) of thickness (t) to outer diameter (D) of the pipe is not less than 0.01 and not more than 0.40. In the other embodiments of the method for producing a titanium alloy pipe according to this invention, it is desirable to extrude the titanium alloy material at a temperature not lower than 900° C. and not higher than 1150° C., preferably using a vitreous lubricant when occasion demands.

The joined tubular body according to the other aspect of this invention is characterized by joining the titanium alloy pipes according to claim 3 or claim 4 with each other, or by joining the titanium alloy pipe according to claim 3 and the titanium alloy according to claim 4 with each other.

In an embodiment of the joined tubular body according to this invention, the pipes may be seamless. In another embodiment of the joined tubular body according to this invention, the ratio (t/D) of thickness (t) to outer diameter (D) of the pipes may be not less than 0.01 and not more than 0.40.

The method for producing a joined tubular body according to the other aspect of this invention is characterized by comprising the steps of forming a joint layer of which melting point ($M_J$) is lower than melting point ($M_M$) of titanium alloy pipes to be joined with each other on one or both of joint faces of the titanium alloy pipes and/or inserting a joint metal of which melting point ($M_J$) is lower than melting point ($M_M$) of the titanium alloy pipes to be joined with each other between the joint faces of the titanium alloy pipes, and joining the titanium alloy pipes with each other by heating the pipes at a temperature (T) higher than ($M_J$) and lower than ($M_M$) and holding the pipes at the temperature (T) for a predetermined period at the same time of applying pressure on the joint faces of the titanium alloy pipes to be joined with each other, or by comprising the steps of inserting a joint member between joint faces of titanium alloy pipes to be joined with each other, the joint member being previously formed with joint layers of which melting point ($M_J$) is lower than melting point ($M_M$) of the titanium alloy pipes on both ends faces thereof, and joining the titanium alloy pipes with each other by heating the pipes at a temperature (T) higher than ($M_J$) and lower than ($M_M$) and holding the pipes at the temperature (T) for a predetermined period at the same time of applying pressure on the joint faces of the titanium alloy pipes to be joined with each other.

In embodiments of the method for producing a joined tubular body according to this invention, the joint metal and the joint layer may be formed in a thickness of not less than 1 $\mu$m and not more than 100 $\mu$m, and may consist essentially of Ti, Zr, Cu and Ni with the proviso that Ti and Zr are not less than 20 wt % respectively, the total sum of Ti and Zr is not less than 40 wt % and not more than 90 wt %, and the total sum of Cu and Ni is not less than 10 wt % and not more than 60 wt %.

In the other embodiments of the method for producing a joined tubular body according to this invention, the titanium alloy pipes can be heated at the temperature (T) through high-frequency induction heating in a frequency not higher than 200 kHz preferably in a vacuum or inert gas in which oxygen content and nitrogen content are not higher than 0.01% in volume, respectively.

Further in the other embodiments of the method for producing a joined tubular body according to this invention, the pipes may be joined in a state where the joint faces of the pipes are inclined and may be joined by using a joining apparatus provided with a heating means for heating the joint faces of the titanium alloy pipes, a temperature measuring means for measuring a temperature at the joint faces of the pipes, a pressing means for applying pressure on the joint faces of the pipes, a pressure measuring means for measuring the pressure applied on the joint faces of the pipes and a control means for controlling the respective means.

DETAILED DESCRIPTION OF THE INVENTION

Figure 1A:
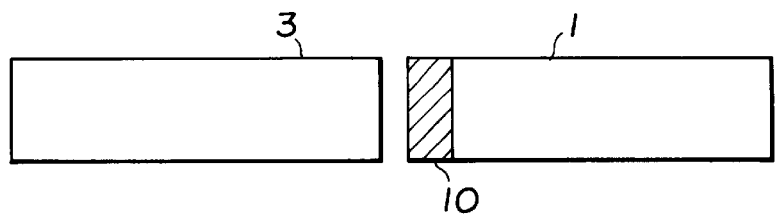
FIGS. 1A, 1B, 1C, 1D, and 1E are schematic illustrations showing arrangement of the joint metal, joint layer and joint member for joining the titanium alloy pipes in examples of this invention.

In the titanium alloy and the titanium alloy pipe according to this invention, which have the chemical composition as described above, sulfides and inclusions in the titanium alloy containing S finely disperse in granular forms by adding REM (rare earth metals) into the titanium or titanium alloy and nuclei of grain growth disperse widely in the titanium alloy. Whereby coarsening of crystal gain at a high-temperature region higher than $\alpha$–$\beta$ transition temperature is suppressed and coarsening of crystal grain in the base metal of the titanium alloy caused by thermal effect in joining is inhibited. Accordingly, mechanical property at the joined zone of the titanium alloy is prevented from the deterioration caused by the thermal effect at the time of joining the titanium alloy.

Even in cases of applying high upset pressure on the base metal such as a case of the friction welding, plastic deformability in the vicinity of joined zone is maintained by the inhibition of the coarsening of crystal grain, therefore defects such as cracks in the joined zone become hard to generate and the performance of the welded joint is improved.

Furthermore, generally in a case of producing the titanium alloy pipe by hot-extruding the titanium alloy material, though deformation resistance decreases and the manufacturing becomes easy by extruding the material at a temperature region of $\beta$-phase, the toughness and ductility of the titanium alloy is degraded by the coarsening of crystal grain. However, the addition of REM into the titanium alloy is very effective to inhibit the coarsening of crystal grain at the temperature region higher than $\alpha$–$\beta$ transition temperature as mentioned above, accordingly, the titanium alloy material containing REM and S is extruded easily without degradation of the toughness and ductility.

Additionally, the sulfides and inclusions dispersed finely and uniformly work effectively for preventing oxidation of the titanium alloy at the time of hot-extruding, and are rich in affinity with vitreous materials used for lubrication and effective to suppress separation of the lubricant during hot-extruding. Accordingly, surface of the titanium alloy pipe becomes fine and the extruding die is reduced in its abrasion and damage.

The aforementioned effects of REM and S are similarly confirmed also in Ca as well as REM and in SE, Te as well as S.

The reason why the chemical composition (weight percentage) of the titanium alloy or titanium alloy pipe according to this invention is limited will be described below together with functions of the respective elements.

S, Se and Te

Each of S, Se and Te forms inclusions in the titanium alloy by being contained not less than 0.01% respectively, and acts as nuclei of grain growth at the time of α–β transformation, thereby preventing the crystal grains from the coarsening. However, they deteriorate deformability of the alloy at a high-temperature region remarkably and degrades the extruding workability when they are contained excessively. Therefore, the upper limits of these elements are defined as 10% respectively, and the upper limit of the total sum of these elements is also defined as 10% in a case of combinational addition.

REM and Ca

In this invention, REM means Sc, Y and lanthanoid series (Atomic No. 57~71). These rare earth metals combine with S, Se and Te to form stable compounds, and have a function to inhibit the coarsening of crystal grain in heat affected zone at the time of joining or the coarsening of crystal grain at the time of extruding the titanium alloy material into a tubular shape by dispersing the compounds as granular inclusions. Such the function of REM is obtained by containing not less than 10% of any one or more of REM, however the upper limit of REM is defined as 10% since strength and corrosion resistance of the titanium alloy or the titanium alloy pipe are deteriorated by containing them excessively.

Ca also combines with S, Se and Te to form stable compounds and has a function to inhibit the coarsening of crystal grain similarly to REM, accordingly the lower limit of Ca is defined as 0.01%. However if Ca is contained excessively, the strength and the corrosion resistance are deteriorated similarly to the case of REM, therefore the upper limit of Ca and the upper limit of the total sum of Ca and REM are defined as 10%, respectively.

Al, V, Sn, Co, Cu, Ta, Mn, Hf, W, Si, Nb, Zr, Mo and O

All of these elements are useful for improving the strength of the titanium alloy or the titanium alloy pipe. Al, Sn, Co, Cu, Ta, Mn, Hf, W, Si and Nb among these elements improve the strength of the titanium alloy or the titanium alloy pipe by forming compounds with Ti, however excessive addition of above-mentioned elements damage the plastic deformability of titanium alloy or the titanium alloy pipe and degrade the extruding workability and toughness. Therefore, 10% of Al, 15% of Sn, 10% of Co, 10% of Cu, 15% of Ta, 10% of Mn. 10% of Hf, 10% of W, 0.5% of Si, and 20% of Nb are defined as upper limits of the respective elements.

Zr, Mo and V are added in the titanium alloy in order to control the crystal grain of the titanium alloy and to obtain reasonable strength and the plastic deformability, but β-phase is stabilized owing to excessive addition of the elements. Accordingly, 10% of Zr, 15% of Mo and 25% of V are defined as upper limits of the respective elements.

Furthermore, although O improves the strength of the titanium alloy or the titanium alloy pipe, the alloy or the pipe is embrittled by excessive addition of O, therefore the upper limit of O is defined as 0.1%.

The plastic deformability of the titanium alloy is damaged and the toughness is deteriorated if the total sum of Al, V, Sn, Co, Cu, Ta, Mn, Hf, W, Si, Nb, Zr, Mo and O is too much, therefore the total sum of these elements is limited to not more than 30%.

Ratio (t/D) of Thickness (t) to Outer Diameter (D) of Pipe

The lower limit of the ratio (t/D) is defined as 0.01 because the less ratio (t/D) of thickness (t) to outer diameter (D) of pipe, the more equipment cost mounts up owing to increase of required extruding force and scaling up of the equipment. The upper limit of the ratio (t/D) is defined as 0.40 because the titanium alloy pipe with a large ratio (t/D) can be manufactured also by machining and the titanium alloy pipe having an excessively large ratio (t/D) is not so valuable industrially.

Extruding Temperature

In a case where the titanium alloy material is extruded at a low temperature, friction between material and die becomes larger owing to larger deformation resistance of the material even in a case of using lubricants, so that damage of the die and deterioration of surface quality of products are caused. Therefore, the lower limit of the extruding temperature is defined as 900° C. Contrary to this, in a case where the extruding temperature is high, it becomes impossible to avoid a mischievous influence caused by the coarsening of crystal grain nevertheless the coarsening of crystal grain is suppressed by adding the respective elements, and the upper limit of the extruding temperature is defined as 1150° C.

EXAMPLES

Examples 1~40

Round rods (20 mm in diameter) of the titanium alloys having compositions shown in Table 4 to Table 10 were joined through TIG welding under the condition shown in Table 1, friction welding under the condition shown in Table 2, and diffusion welding under the condition shown in Table 3, respectively. Subsequently, obtained welded joints were subjected to tensile test and bending test, and evaluated by comparing with the specific value of the respective titanium alloy base metals. Obtained results are also shown in Tables 4 to 10 collectively.

TABLE 1

| Welding condition of TIG welding | |
| --- | --- |
| Filler metal | The same composition as respective titanium alloy base metal (1.6 mm in diameter) |
| Welding current | 150 A |
| Shielding gas | Ar |
| Flow rate of shielding gas | 30 l/min |

TABLE 2

| Condition of friction welding | |
| --- | --- |
| Rotational frequency of main shaft | 3000 r.p.m |
| Frictional pressure | 150 MPa |
| Friction time | 10 sec |
| Upset pressure | 200 Mpa |
| Upset time | 5 sec |

TABLE 3

| Condition of diffusion welding | |
| --- | --- |
| Joining temperature | 800° C. |
| Holding time | 7.2 ksec |
| Welding pressure | 3 MPa |
| Degree of vacuum | $1 \times 10^{-6}$ Torr |

TABLE 4

| No. | | 1 | 2 | 3 | 4 | 5 | 6 |
|---|---|---|---|---|---|---|---|
| Distinction | | Comparative Example | Comparative Example | Inventive Example | Inventive Example | Inventive Example | Inventive Example |
| Chemical Composition (wt %) | S | 0.005 | 0.10 | 0.01 | 0.1 | 1 | 5 |
| | REM | 10 | — | 0.01 | 2 | 5 | 10 |
| | Se | — | — | — | — | — | — |
| | Te | — | — | — | — | — | — |
| | Ca | — | — | — | — | — | — |
| | Al | — | — | — | — | 6 | 6 |
| | V | — | — | — | — | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joining Method | | TIG Welding | TIG Welding | TIG Welding | TIG Welding | TIG Welding | TIG Welding |
| Joint Strength Ratio | | 1.0 | 1.0 | 1.0 | 1.0 | 1.0 | 1.0 |
| Location of Fracture in Bending Test Piece | | Fused line | Fused line | No Fracture | No Fracture | No Fracture | No Fracture |
| Evaluation | | Δ | Δ | ○ | ○ | ○ | ○ |

TABLE 5

| No. | | 7 | 8 | 9 | 10 | 11 | 12 |
|---|---|---|---|---|---|---|---|
| Distinction | | Inventive Example | Comparative Example | Comparative Example | Inventive Example | Inventive Example | Inventive Example |
| Chemical Composition (wt %) | S | 10 | 15 | 0.005 | 0.10 | 0.01 | 0.01 |
| | REM | 10 | 15 | 0.006 | 2 | 0.01 | 0.01 |
| | Se | — | — | 0.005 | 0.005 | 0.01 | 0.01 |
| | Te | — | — | — | 0.005 | — | 0.01 |
| | Ca | — | — | — | 0.005 | — | — |
| | Al | 6 | 6 | — | — | — | — |
| | V | 4 | 4 | — | — | — | — |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joining Method | | TIG Welding | Friction Welding | TIG Welding | TIG Welding | TIG Welding | TIG Welding |
| Joint Strength Ratio | | 1.0 | 0.8 | 1.0 | 1.0 | 1.0 | 1.0 |
| Location of Fracture in Bending Test Piece | | No Fracture | Joint Face | Fused line | No Fracture | No Fracture | No Fracture |
| Evaluation | | ○ | x | Δ | ○ | ○ | ○ |

TABLE 6

| No. | | 13 | 14 | 15 | 16 | 17 | 18 |
|---|---|---|---|---|---|---|---|
| Distinction | | Inventive Example | Inventive Example | Inventive Example | Inventive Example | Comparative Example | Comparative Example |
| Chemical Composition (wt %) | S | 0.1 | 2 | 5 | 3 | 10 | 5 |
| | REM | 2 | 5 | 7 | 10 | 10 | — |
| | Se | 0.01 | 0.1 | 2 | 3 | 5 | 2 |
| | Te | 0.01 | — | 3 | 4 | — | 5 |
| | Ca | 0.01 | 3 | 3 | — | — | 10 |
| | Al | — | — | 6 | 6 | 6 | 6 |
| | V | — | — | 4 | 4 | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joining Method | | TIG Welding | TIG Welding | Friction Welding | Friction Welding | Friction Welding | Friction Welding |
| Joint Strength Ratio | | 1.0 | 1.0 | 1.0 | 1.0 | 0.9 | 0.8 |
| Location of Fracture in Bending Test Piece | | No Fracture | No Fracture | No Fracture | No Fracture | Joint Face | Joint Face |
| Evaluation | | ○ | ○ | ○ | ○ | x | x |

TABLE 7

| No. | | 19 | 20 | 21 | 22 | 23 | 24 |
|---|---|---|---|---|---|---|---|
| Distinction | | Comparative Example | Comparative Example | Inventive Example | Inventive Example | Inventive Example | Inventive Example |
| Chemical Composition (wt %) | S | 0.005 | 0.005 | 0.01 | 0.1 | 1 | 2 |
| | REM | 0.005 | 0.005 | 0.01 | 1 | 2 | 5 |
| | Se | — | 0.005 | 0.01 | — | 2 | 4 |
| | Te | — | 0.005 | — | 1 | — | 1 |
| | Ca | — | 0.005 | — | 2 | 4 | 3 |
| | Al | 6 | 6 | 4 | 10 | 6 | 8 |
| | V | 6 | 6 | 22 | 20 | — | 1 |
| | Sn | 2 | 2 | — | — | 2 | — |

TABLE 7-continued

| No. | | 19 | 20 | 21 | 22 | 23 | 24 |
|---|---|---|---|---|---|---|---|
| | Co | — | — | — | — | — | — |
| | Cu | — | — | — | — | — | — |
| | Ta | — | — | — | — | — | — |
| | Mn | — | — | — | — | — | 6 |
| | Hf | — | — | — | — | — | 3 |
| | W | — | — | — | — | — | 7 |
| | Si | — | — | — | — | — | 0.2 |
| | Nb | — | — | — | — | — | 4 |
| | Zr | — | — | — | — | 4 | 5 |
| | Mo | — | — | — | — | 2 | 1 |
| | O | — | — | — | — | — | — |
| | Ti | Bal. | Bal. | Bal. | Bal. | Bal. | Bal. |
| Joining Method | | TIG Welding | TIG Welding | TIG Welding | TIG Welding | TIG Welding | TIG Welding |
| Joint Strength Ratio | | 1.0 | 1.0 | 1.0 | 1.0 | 1.0 | 1.0 |
| Location of Fracture in Bending Test Piece | | Fused line | Fused line | No Fracture | No Fracture | No Fracture | No Fracture |
| Evaluation | | Δ | Δ | ○ | ○ | ○ | ○ |

TABLE 8

| No. | | 25 | 26 | 27 | 28 | 29 | 30 |
|---|---|---|---|---|---|---|---|
| Distinction | | Inventive Example | Inventive Example | Inventive Example | Inventive Example | Inventive Example | Inventive Example |
| Chemical Composition (wt %) | S | 3 | 7 | 2 | 1 | 2 | 2 |
| | REM | 4 | 10 | 7 | 10 | 3 | 7 |
| | Se | — | — | 5 | 8 | 1 | — |
| | Te | 7 | — | 3 | 0.01 | 1 | 5 |
| | Ca | — | — | 2 | — | — | — |
| | Al | — | — | 7 | 4 | — | — |
| | V | — | — | 4 | 25 | — | — |
| | Sn | — | — | 1 | — | 15 | — |
| | Co | — | — | 2 | — | — | 10 |
| | Cu | 7 | — | 4 | — | — | 10 |
| | Ta | 10 | — | 2 | — | 15 | — |
| | Mn | — | — | 2 | — | — | 10 |
| | Hf | — | — | 1 | — | — | — |
| | W | — | — | 5 | — | — | — |
| | Si | — | — | — | — | — | — |
| | Nb | — | — | 1 | — | — | — |
| | Zr | — | — | 1 | — | — | — |
| | Mo | 10 | — | — | — | — | — |
| | O | 0.5 | — | — | 1 | — | — |
| | Ti | Bal. | Bal. | Bal. | Bal. | Bal. | Bal. |
| Joining Method | | Friction Welding | Diffusion Welding | Diffusion Welding | Friction Welding | Friction Welding | Friction Welding |
| Joint Strength Ratio | | 1.0 | 1.0 | 1.0 | 1.0 | 1.0 | 1.0 |

TABLE 8-continued

| No. | 25 | 26 | 27 | 28 | 29 | 30 |
|---|---|---|---|---|---|---|
| Location of Fracture in Bending Test Piece | No Fracture | No Fracture | No Fracture | No Fracture | No Fracture | No Fracture |
| Evaluation | ○ | ○ | ○ | ○ | ○ | ○ |

TABLE 9

| No. | | 31 | 32 | 33 | 34 | 35 | 36 |
|---|---|---|---|---|---|---|---|
| Distinction | | Inventive Example | Inventive Example | Inventive Example | Comparative Example | Comparative Example | Comparative Example |
| Chemical Composition (wt %) | S | 2 | 2 | 2 | 1 | 1 | 1 |
| | REM | 5 | 5 | 5 | 3 | 3 | 3 |
| | Se | 1 | — | — | 1 | 3 | 0.1 |
| | Te | 1 | — | 2 | 1 | — | — |
| | Ca | — | 3 | 1 | 1 | — | 3 |
| | Al | — | — | — | 20 | — | — |
| | V | — | — | — | — | 30 | — |
| | Sn | — | — | — | — | — | 20 |
| | Co | — | — | — | 15 | — | — |
| | Cu | — | — | — | — | — | 15 |
| | Ta | — | — | — | — | — | — |
| | Mn | — | — | — | — | — | — |
| | Hf | 10 | — | — | — | — | — |
| | W | 10 | — | — | — | — | — |
| | Si | 0.5 | — | — | — | — | — |
| | Nb | — | 20 | — | — | — | — |
| | Zr | — | 10 | — | — | — | — |
| | Mo | — | — | 15 | — | — | — |
| | O | — | — | — | — | 2 | — |
| | Ti | Bal. | Bal. | Bal. | Bal. | Bal. | Bal. |
| Joining Method | | Friction Welding | Friction Welding | Friction Welding | Friction Welding | Friction Welding | Friction Welding |
| Joint Strength Ratio | | 1.0 | 1.0 | 1.0 | 1.0 | 1.0 | 1.0 |
| Location of Fracture in Bending Test Piece | | No Fracture | No Fracture | No Fracture | Joint Face | Joint Face | Joint Face |
| Evaluation | | ○ | ○ | ○ | Δ | Δ | Δ |

TABLE 10

| Distinction | | 37 Comparative Example | 38 Comparative Example | 39 Comparative Example | 40 Comparative Example |
|---|---|---|---|---|---|
| Chemical Composition (wt %) | S | 3 | 3 | 3 | 3 |
| | REM | 5 | 5 | 5 | 5 |
| | Se | 6 | — | 2 | — |
| | Te | — | 3 | 2 | — |
| | Ca | — | 3 | 2 | 5 |
| | Al | — | — | — | — |
| | V | — | — | — | — |
| | Sn | — | — | — | — |
| | Co | — | — | — | — |
| | Cu | — | — | — | — |
| | Ta | 20 | — | — | — |
| | Mn | 15 | — | — | — |
| | Hf | — | 15 | — | — |
| | W | — | 15 | — | — |
| | Si | — | — | 1 | — |
| | Nb | — | — | 23 | — |
| | Zr | — | — | 12 | — |
| | Mo | — | — | — | 20 |
| | O | — | — | — | — |
| | Ti | Bal. | Bal. | Bal. | Bal. |
| Joining Method | | Friction Welding | Friction Welding | Friction Welding | Friction Welding |
| Joint Strength Ratio | | 1.0 | 1.0 | 1.0 | 1.0 |
| Location of Fracture in Bending Test Piece | | Joint Face | Joint Face | Joint Face | Joint Face |
| Evaluation | | Δ | Δ | Δ | Δ |

As shown in Table 4 to table 10, in the inventive example satisfying the chemical composition defined in this invention, a joint strength ratio (ratio of joint strength to the base metal strength) showed good value respectively, and no test piece was fractured in the bending test in all of the joining methods of TIG welding, friction welding and diffusion welding, therefore good results could be obtained.

As compared with above, the bending test pieces were fractured along the fusion lines respectively in comparative alloy No. 1 which is short of S content and comparative alloy No. 2 which is short of REM content, the joint strength ratio was low and bending test piece was fractured at the joint face in comparative alloy No. 8 which is excessive in S and REM content, and the bending test piece was fractured at the fusion line in comparative alloy NO. 9 which is insufficient in S, Se and REM content. In comparative alloys Nos. 17 and 18 in which S, Se and Te exceed 10% in total, the joint strength ratios were low and the respective bending test pieces were fractured from the joint faces. Furthermore, the bending test pieces were fractured from the fusion lines respectively in comparative alloys Nos. 19 and 20 which are insufficient in S, Se, Te, REM and Ca content, and the bending test pieces were fractured at the joint faces in comparative alloys Nos. 34 to 40 which are excessive in Al, V, Sn, Co, Cu, Ta, Mn, Hf, W, Si, Nb, Zr or Mo content.

Examples 41~49

Titanium alloy blocks (100 mm in diameter) having compositions shown in Table 11 and Table 12 were subjected to hot-extruding at 1000° C. using a mandrel with a diameter of 60 mm after coating vitreous lubricants on surfaces of the respective blocks, thereby manufacturing respective seamless titanium alloy pipes.

Subsequently, obtained titanium alloy pipes were subjected to the flattening test specified in JIS respectively, and productivity of the respective pipes was evaluated in a view of manufacturing efficiency. Furthermore, the penetrant inspection was carried out on outer and inner surfaces of the respective titanium alloy pipes subjected to the flattening test thereby examining the presence of crack. The results are shown together in Tables 11 and 12.

TABLE 11

| No. | | 41 | 42 | 43 | 44 | 45 | 46 |
|---|---|---|---|---|---|---|---|
| Distinction | | Comparative Example | Comparative Example | Inventive Example | Inventive Example | Inventive Example | Inventive Example |
| Chemical Composition (wt %) | S | 0.005 | 0.10 | 0.01 | 0.1 | 1 | 5 |
| | REM | 12 | — | 0.01 | 2 | 5 | 10 |
| | Se | — | — | — | — | — | — |
| | Te | — | — | — | — | — | — |
| | Ca | — | — | — | — | — | — |
| | Al | 6 | 6 | 6 | — | 6 | 6 |
| | V | 4 | 4 | 4 | — | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Manufacturing Method for Pipe | | Extruding | TIG Welding | Extruding | Extruding | Extruding | Extruding |

TABLE 11-continued

| No. | 41 | 42 | 43 | 44 | 45 | 46 |
|---|---|---|---|---|---|---|
| t/D | 0.2 | 0.2 | 0.2 | 0.2 | 0.2 | 0.2 |
| Manufacturing Efficiency | ○ | x | ○ | ○ | ○ | ○ |
| Flattening Test (Remarks) | x (Cracks) | x (Welding Cracks) | ○ | ○ | ○ | ○ |
| Evaluation | x | x | ○ | ○ | ○ | ○ |

TABLE 12

| | | No. | | |
|---|---|---|---|---|
| Distinction | | 47 Inventive Example | 48 Inventive Example | 49 Comparative Example |
| Chemical Composition (wt %) | S | 10 | 10 | 15 |
| | REM | 7 | 10 | 15 |
| | Se | — | — | — |
| | Te | — | — | — |
| | Ca | — | — | — |
| | Al | 6 | 6 | 6 |
| | V | 4 | 4 | 4 |
| | Sn | — | — | — |
| | Co | — | — | — |
| | Cu | — | — | — |
| | Ta | — | — | — |
| | Mn | — | — | — |
| | Hf | — | — | — |
| | W | — | — | — |
| | Si | — | — | — |
| | Nb | — | — | — |
| | Zr | — | — | — |
| | Mo | — | — | — |
| | O | — | — | — |
| | Ti | Bal. | Bal. | Bal. |
| Manufacturing Method for Pipe | | Extruding | Extruding | Extruding |
| t/D | | 0.2 | 0.2 | 0.2 |
| Manufacturing Efficiency | | ○ | ○ | ○ |
| Flattening Test (Remarks) | | ○ | ○ | Δ (Cracks) |
| Evaluation | | ○ | ○ | Δ |

As is obvious from the results shown in Tables 11 and 12, the titanium alloy pipes Nos. 43 to 48 according to inventive examples were high in the manufacturing efficiency, and no crack was observed in the flattening test. As compared with the above, desirable results could not be obtained in the comparative alloy pipes No. 1 (insufficient in S and REM content) and No. 2 (lacking in REM and Ca). Furthermore, in the comparative alloy pipe No. 9, which is excessive in S and REM content, the deformability was degraded and cracks were generated in the flattening test.

Examples 50~61

Similarly to the previous examples, titanium alloy blocks (100 mm in diameter) of 12 kinds having compositions shown in Table 13 and Table 14 were subjected to hot-extruding at 1000° C. using a mardrel with 50 mm in diameter after coating vitreous lubricants on surfaces of the respective blocks, thereby manufacturing seamless titanium alloy pipes of 12 kinds.

Subsequently, obtained seamless pipes were subjected to the flattening test and productivity of the respective pipes was evaluated in a view of manufacturing efficiency. Further, the presence of cracks on outer and inner surfaces of the respective pipes was examined by carrying out the penetrant inspection against the pipes after the flattening test. The results are shown together in Tables 13 and 14.

TABLE 13

| No. | | 50 | 51 | 52 | 53 | 54 | 55 |
|---|---|---|---|---|---|---|---|
| Distinction | | Comparative Example | Comparative Example | Comparative Example | Inventive Example | Inventive Example | Inventive Example |
| Chemical Composition (wt %) | S | — | — | 0.005 | — | 0.01 | 0.01 |
| | REM | 0.005 | 0.01 | 0.01 | 0.01 | 0.01 | 0.01 |
| | Se | 0.005 | 0.002 | 0.002 | — | — | 0.01 |
| | Te | — | 0.007 | 0.002 | 0.01 | 0.01 | 0.01 |
| | Ca | 0.005 | 0.01 | 0.01 | — | 0.01 | 0.01 |
| | Al | 6 | 6 | 6 | 6 | 6 | 6 |
| | V | 4 | 4 | 4 | 4 | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Manufacturing Method for Pipe | | Extruding | Extruding | Extruding | Extruding | Extruding | Extruding |
| t/D | | 0.25 | 0.25 | 0.25 | 0.25 | 0.25 | 0.25 |
| Manufacturing Efficiency | | ○ | ○ | ○ | ○ | ○ | ○ |
| Flattening Test (Remarks) | | x (Cracks) | x (Cracks) | x (Cracks) | ○ | ○ | ○ |
| Evaluation | | x | x | x | ○ | ○ | ○ |

TABLE 14

| No. | | 56 | 57 | 58 | 59 | 60 | 61 |
|---|---|---|---|---|---|---|---|
| Distinction | | Inventive Example | Inventive Example | Inventive Example | Inventive Example | Comparative Example | Comparative Example |
| Chemical Composition (wt %) | S | 1 | 5 | — | — | 1 | — |
| | REM | 3 | 4 | 8 | — | 5 | — |
| | Se | 0.1 | — | 5 | 10 | — | 5 |
| | Te | 0.5 | 2 | 5 | — | 10 | 5 |
| | Ca | 2 | 3 | 2 | 10 | 8 | 15 |
| | Al | 4 | 4 | 4 | 4 | 4 | 4 |
| | V | 3 | 3 | 3 | 3 | 3 | 3 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |

TABLE 14-continued

| No. | 56 | 57 | 58 | 59 | 60 | 61 |
|---|---|---|---|---|---|---|
| Manufacturing Method for Pipe | Extruding | Extruding | Extruding | Extruding | Extruding | Extruding |
| t/D | 0.25 | 0.25 | 0.25 | 0.25 | 0.25 | 0.25 |
| Manufacturing Efficiency | ○ | ○ | ○ | ○ | ○ | ○ |
| Flattening Test (Remarks) | ○ | ○ | ○ | ○ | x (Cracks) | x (Cracks) |
| Evaluation | ○ | ○ | ○ | ○ | x | x |

As is evident from the results shown in Tables 13 and 14, the manufacturing efficiency was high and no crack was observed in the flattening test in the inventive alloy pipes Nos. 53 to 60. As compared with above, in the comparative alloy pipes Nos. 11 to 13 which are insufficient in S, Se, Te content and REM, Ca content, cracks were generated through the flattening test, conversely in the comparative alloy pipes No. 60 which are excessive in S, Se and Te content and in the comparative alloy pipe No. 61 which is excessive in Ca content, cracks were generated in the flattening test.

Examples 62~78

Titanium alloy blocks (100 mm in diameter) of 17 kinds having compositions shown in Table 15 to Table 17 were subjected to hot-extruding at 1000° C. using a mandrel with 40 mm in diameter after coating vitreous lubricants on surfaces of the respective blocks to manufacturing seamless titanium alloy pipes.

Subsequently, obtained seamless pipes were subjected to the flattening test and productivity of the respective pipes was evaluated in a view of manufacturing efficiency. Furthermore, the presence of cracks on outer and inner surfaces of the pipes was examined by carrying out the penetrant inspection against the pipes subjected to the flattening test. The results are shown together in Tables 15 to 17.

TABLE 15

| No. | | 62 | 63 | 64 | 65 | 66 | 67 |
|---|---|---|---|---|---|---|---|
| Distinction | | Inventive Example | Inventive Example | Inventive Example | Inventive Example | Inventive Example | Inventive Example |
| Chemical Composition (wt %) | S | 2 | 5 | 7 | 5 | 5 | 5 |
| | REM | 5 | 8 | 8 | 7 | 9 | 6 |
| | Se | — | 2 | — | 2 | — | — |
| | Te | 1 | — | 2 | — | 4 | 4 |
| | Ca | 2 | 1 | — | 2 | — | 3 |
| | Al | 4 | 10 | 5 | 6 | 6 | — |
| | V | 22 | 20 | 25 | 4 | 4 | — |
| | Sn | 3 | — | — | 10 | 15 | — |
| | Co | — | — | — | — | — | 10 |
| | Cu | — | — | — | — | — | 10 |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |

TABLE 15-continued

| No. | 62 | 63 | 64 | 65 | 66 | 67 |
|---|---|---|---|---|---|---|
| Mo | — | — | — | — | — | — |
| O | — | — | — | — | — | — |
| Ti | Bal. | Bal. | Bal. | Bal. | Bal. | Bal. |
| Manufacturing Method for Pipe | Extruding | Extruding | Extruding | Extruding | Extruding | Extruding |
| t/D | 0.3 | 0.3 | 0.3 | 0.3 | 0.3 | 0.3 |
| Manufacturing Efficiency | ○ | ○ | ○ | ○ | ○ | ○ |
| Flattening Test (Remarks) | ○ | ○ | ○ | ○ | ○ | ○ |
| Evaluation | ○ | ○ | ○ | ○ | ○ | ○ |

TABLE 16

| No. | | 68 | 69 | 70 | 71 | 72 | 73 |
|---|---|---|---|---|---|---|---|
| Distinction | | Inventive Example | Inventive Example | Inventive Example | Inventive Example | Comparative Example | Comparative Example |
| Chemical Composition (wt %) | S | 5 | 5 | 5 | 5 | 5 | 5 |
| | REM | 7 | 7 | 7 | 7 | 7 | 7 |
| | Se | 2 | 2 | 2 | 2 | 2 | 2 |
| | Te | 2 | 2 | 2 | 2 | 2 | 2 |
| | Ca | 2 | 2 | 2 | 2 | 2 | 2 |
| | Al | — | — | — | 5 | 15 | — |
| | V | — | — | — | — | 20 | 25 |
| | Sn | — | — | — | 2.5 | — | 15 |
| | Co | — | — | — | — | — | — |
| | Cu | — | — | — | — | — | — |
| | Ta | 15 | — | — | — | — | — |
| | Mn | 10 | — | — | — | — | — |
| | Hf | — | 10 | — | — | — | — |
| | W | — | 10 | — | — | — | — |
| | Si | — | 0.5 | — | — | — | — |
| | Nb | — | — | 20 | — | — | — |
| | Zr | — | — | 10 | — | — | — |
| | Mo | — | — | — | 15 | — | — |
| | O | — | 0.1 | — | — | — | — |
| | Ti | Bal. | Bal. | Bal. | Bal. | Bal. | Bal. |
| Manufacturing Method for Pipe | | Extruding | Extruding | Extruding | Extruding | Extruding | Extruding |
| t/D | | 0.3 | 0.3 | 0.3 | 0.3 | 0.3 | 0.3 |
| Manufacturing Efficiency | | ○ | ○ | ○ | ○ | ○ | ○ |
| Flattening Test (Remarks) | | ○ | ○ | ○ | ○ | x (Cracks) | x (Cracks) |
| Evaluation | | ○ | ○ | ○ | ○ | x | x |

TABLE 17

| Distinction | | 74 Comparative Example | 75 Comparative Example | 76 Comparative Example | 77 Comparative Example | 78 Comparative Example |
|---|---|---|---|---|---|---|
| | | No. | | | | |
| Chemical Composition (wt %) | S | 5 | 5 | 5 | 5 | 5 |
| | REM | 7 | 7 | 7 | 7 | 7 |
| | Se | 2 | 2 | 2 | 2 | 2 |
| | Te | 2 | 2 | 2 | 2 | 2 |
| | Ca | 2 | 2 | 2 | 2 | 2 |
| | Al | — | — | — | — | 6 |
| | V | — | — | — | — | 4 |
| | Sn | — | — | — | — | — |
| | Co | 15 | — | — | — | — |
| | Cu | — | 15 | — | — | — |
| | Ta | 20 | — | — | — | — |
| | Mn | — | 15 | — | — | — |
| | Hf | — | — | 15 | — | — |
| | W | — | 10 | 15 | — | — |
| | Si | — | 0.5 | 1 | — | — |
| | Nb | — | — | — | 22 | — |
| | Zr | — | — | — | 13 | — |
| | Mo | — | — | — | — | 20 |
| | O | — | 0.1 | — | — | — |
| | Ti | Bal. | Bal. | Bal. | Bal. | Bal. |
| Manufacturing Method for Pipe | | Extruding | Extruding | Extruding | Extruding | Extruding |
| t/D | | 0.3 | 0.3 | 0.3 | 0.3 | 0.3 |
| Manufacturing Efficiency | | ○ | ○ | ○ | ○ | ○ |
| Flattening Test (Remarks) | | x (Cracks) | x (Cracks) | x (Cracks) | x (Cracks) | x (Cracks) |
| Evaluation | | x | x | x | x | x |

As is obvious from the results shown in Tables 15 to 17, in the titanium alloy pipes Nos. 62 to 71 according to inventive examples of this invention, the manufacturing efficiency was high and no crack was observed in the flattening test. However, cracks was generated in the flattening test in comparative pipe No. 72 which is excessive in the total sum of Al and V content, in comparative pipe No. 73 which is excessive in the total sum of V and Sn content, in comparative pipe No. 74 which excessive in the total sum of Co and Ta content, in comparative pipe No. 75 which is excessive in the total sum of Cu and Mn content, in comparative pipe No. 76 which is excessive in Si content and the total sum of Hf and W content, in comparative pipe No. 77 which is excessive in the total sum of Nb and Zr content and in comparative pipe No. 78 which is excessive in Mo content.

Examples 79–87

Titanium alloy blocks (100 mm in diameter) of 9 kinds having compositions shown in Table 18 and Table 19 were subjected to hot-extruding at a temperature between 880 and 1250° C. using mandrels having various diameters after coating vitreous lubricants on surfaces of the respective blocks, thereby manufacturing seamless alloy pipes having various thickness.

Subsequently, obtained seamless pipes were subjected to the flattening test and productivity of the respective pipes was evaluated in a view of manufacturing efficiency. Furthermore, the penetrant inspection was carried out against outer and inner surfaces of the respective titanium alloy pipes after the flattening test in order to examine the presence of crack. The results are shown together in Tables 18 and 19.

TABLE 18

| Distinction | | 79 Comparative Example | 80 Comparative Example | 81 Inventive Example | 82 Inventive Example | 83 Inventive Example |
|---|---|---|---|---|---|---|
| | | No. | | | | |
| Chemical Composition (wt %) | S | 0.01 | 0.01 | 0.01 | 2 | 5 |
| | REM | 0.01 | 0.01 | 0.01 | 5 | 7 |
| | Se | — | — | — | 1 | 2 |
| | Te | — | — | — | 1 | 2 |
| | Ca | — | — | — | 3 | 2 |
| | Al | 6 | 6 | 6 | 4 | 6 |
| | V | 4 | 4 | 4 | 22 | 4 |
| | Sn | — | — | — | — | — |
| | Co | — | — | — | — | — |
| | Cu | — | — | — | — | — |
| | Ta | — | — | — | — | — |
| | Mn | — | — | — | — | — |

TABLE 18-continued

| | | 79 Comparative Example | 80 Comparative Example | 81 Inventive Example | 82 Inventive Example | 83 Inventive Example |
|---|---|---|---|---|---|---|
| Distinction | | | | | | |
| | Hf | — | — | — | — | — |
| | W | — | — | — | — | — |
| | Si | — | — | — | — | — |
| | Nb | — | — | — | — | — |
| | Zr | — | — | — | — | — |
| | Mo | — | — | — | — | — |
| | O | — | — | — | — | — |
| | Ti | Bal. | Bal. | Bal. | Bal. | Bal. |
| Extruding | t/D | 0.4 | 0.5 | 0.4 | 0.4 | 0.3 |
| | Temperature (° C.) | 880 | 900 | 900 | 1050 | 1100 |
| Manufacturing Efficiency | | Δ | Δ | ○ | ○ | ○ |
| Flattening Test (Remarks) | | x (Cracks) | Δ (Small Cracks) | ○ | ○ | ○ |
| Evaluation | | x | x | ○ | ○ | ○ |

TABLE 19

| | | 84 Inventive Example | 85 Inventive Example | 86 Comparative Example | 87 Comparative Example |
|---|---|---|---|---|---|
| Distinction | | | | | |
| Chemical Composition (wt %) | S | 7 | 10 | 10 | 10 |
| | REM | 10 | 10 | 10 | 10 |
| | Se | — | — | — | 5 |
| | Te | 3 | — | — | 1 |
| | Ca | — | — | — | 3 |
| | Al | 10 | 10 | 10 | 8 |
| | V | 20 | 20 | 20 | 10 |
| | Sn | — | — | — | — |
| | Co | — | — | — | — |
| | Cu | — | — | — | — |
| | Ta | — | — | — | — |
| | Mn | — | — | — | — |
| | Hf | — | — | — | — |
| | W | — | — | — | — |
| | Si | — | — | — | — |
| | Nb | — | — | — | — |
| | Zr | — | — | — | — |
| | Mo | — | — | — | — |
| | O | — | — | — | — |
| | Ti | Bal. | Bal. | Bal. | Bal. |
| Extruding | t/D | 0.2 | 0.01 | 0.01 | 0.1 |
| | Temperature (° C.) | 1100 | 1150 | 1200 | 1250 |
| Manufacturing Efficiency | | ○ | ○ | ○ | ○ |
| Flattening Test (Remarks) | | ○ | ○ | Δ (Small Cracks) | x (Cracks) |
| Evaluation | | ○ | ○ | x | x |

As is apparent from the results shown in Tables 18 and 19, in the inventive pipes Nos. 81 to 85, the manufacturing efficiency was high and no crack was observed in the flattening test. As compared with above, in comparative pipe No. 79 extruded at a relatively low temperature, the productivity was not so good because of large resistance for deformation, and also in comparative pipe No. 80 of which (t/D) is relatively high, the productivity was not so good. Furthermore, in comparative pipes Nos. 86 and 87 which were extruded at a temperature not lower than 1200° C., the crystal grains were inclined to coarsen and cracks inclusive of small cracks were generated in the flattening test.

Examples 88~127

Titanium alloy pipes with outer diameter of 100 mm, inner diameter of 60 mm and wall thickness of 20 mm were manufactured through hot-extruding at a temperature of 1000° C. using titanium alloys having compositions shown in Table 20 to Table 26, and the titanium alloy pipes were joined through TIG welding under the condition shown in Table 1, friction welding under the condition shown in Table 2, and diffusion welding under the condition shown in Table 3, respectively. Subsequently, obtained welded joints were subjected to tensile test and bending test, and evaluated by comparing with the specific value of the respective titanium alloy base metals. The obtained results are shown together in Tables 20 to 26.

TABLE 20

| Distinction | | 88 Comparative Example | 89 Comparative Example | 90 Inventive Example | 91 Inventive Example | 92 Inventive Example | 93 Inventive Example |
|---|---|---|---|---|---|---|---|
| Chemical Composition (wt %) | S | 0.005 | 0.10 | 0.01 | 0.1 | 1 | 5 |
| | REN | 10 | — | 0.01 | 2 | 5 | 10 |
| | Te | — | — | — | — | — | — |
| | Ca | — | — | — | — | — | — |
| | Al | — | — | — | — | 6 | 6 |
| | V | — | — | — | — | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joining Method | | TIG Welding | TIG Welding | TIG Welding | TIG Welding | TIG Welding | TIG Welding |
| Joint Strength Ratio | | 1.0 | 1.0 | 1.0 | 1.0 | 1.0 | 1.0 |
| Location of Fracture in Bending Test Piece | | Fused line | Fused line | No Fracture | No Fracture | No Fracture | No Fracture |
| Evaluation | | Δ | Δ | ○ | ○ | ○ | ○ |

TABLE 21

| Distinction | | 94 Inventive Example | 95 Comparative Example | 96 Comparative Example | 97 Inventive Example | 98 Inventive Example | 99 Inventive Example |
|---|---|---|---|---|---|---|---|
| Chemical Composition (wt %) | S | 10 | 15 | 0.005 | 0.10 | 0.01 | 0.01 |
| | REM | 10 | 15 | 0.006 | 2 | 0.01 | 0.01 |
| | Se | — | — | 0.006 | 0.005 | 0.01 | 0.01 |
| | Te | — | — | — | 0.005 | — | 0.01 |
| | Ca | — | — | — | 0.005 | — | — |
| | Al | 6 | 6 | — | — | — | — |
| | V | 4 | 4 | — | — | — | — |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joining Method | | TIC Welding | Friction Welding | TIG Welding | TIG Welding | TIG Welding | TIG Welding |
| Joint Strength Ratio | | 1.0 | 0.8 | 1.0 | 1.0 | 1.0 | 1.0 |
| Location of Fracture in Bending Test Piece | | No Fracture | Joint Face | Fused line | No Fracture | No Fracture | No Fracture |
| Evaluation | | ○ | X | Δ | ○ | ○ | ○ |

TABLE 23

| Distinction | | 106 Comparative Example | 107 Comparative Example | 108 Inventive Example | 109 Inventive Example | 110 Inventive Example | 111 Inventive Example |
|---|---|---|---|---|---|---|---|
| Chemical Composition (wt %) | S | 0.005 | 0.005 | 0.01 | 0.1 | 1 | 2 |
| | REN | 0.005 | 0.005 | 0.01 | 1 | 2 | 5 |
| | Se | — | 0.005 | 0.01 | — | 2 | 4 |
| | Te | — | 0.005 | — | 1 | — | 1 |
| | Ca | — | 0.005 | — | 2 | 4 | 3 |
| | Al | 6 | 6 | 4 | 10 | 6 | 8 |
| | V | 6 | 6 | 22 | 20 | — | 1 |
| | Sn | 2 | 2 | — | — | 2 | — |
| | Co | — | — | — | — | — | — |
| | Cu | — | — | — | — | — | — |
| | Ta | — | — | — | — | — | — |
| | Mn | — | — | — | — | — | 6 |
| | Hf | — | — | — | — | — | 3 |
| | W | — | — | — | — | — | 7 |
| | Si | — | — | — | — | — | 0.2 |
| | Nb | — | — | — | — | — | 4 |
| | Zr | — | — | — | — | 4 | 5 |
| | Mo | — | — | — | — | 2 | 1 |
| | O | — | — | — | — | — | — |
| | Ti | Bal. | Bal. | Bal. | Bal. | Bal. | Bal. |
| Joining Method | | TIG Welding | TIG Welding | TIG Welding | TIG Welding | TIG Welding | TIG Welding |
| Joint Strength Ratio | | 1.0 | 1.0 | 1.0 | 1.0 | 1.0 | 1.0 |
| Location of Fracture in Bending Test Piece | | Fused line | Fused line | No Fracture | No Fracture | No Fracture | No Fracture |
| Evaluation | | Δ | Δ | ○ | ○ | ○ | ○ |

TABLE 24

| Distinction | | 112 Inventive Example | 113 Inventive Example | 114 Inventive Example | 115 Inventive Example | 116 Inventive Example | 117 Inventive Example |
|---|---|---|---|---|---|---|---|
| Chemical Composition (wt %) | S | 3 | 7 | 2 | 1 | 2 | 2 |
| | REM | 4 | 10 | 7 | 10 | 3 | 7 |
| | Se | — | — | 5 | 8 | 1 | — |
| | Te | 7 | — | 3 | 0.01 | 1 | 5 |
| | Ca | — | — | 2 | — | — | — |
| | Al | — | — | 7 | 4 | — | — |
| | V | — | — | 4 | 25 | — | — |
| | Sn | — | — | 1 | — | 15 | — |
| | Co | — | — | 2 | — | — | 10 |
| | Cu | 7 | — | 4 | — | — | 10 |
| | Ta | 10 | — | 2 | — | 15 | — |
| | Mn | — | — | 2 | — | — | 10 |
| | Hf | — | — | 1 | — | — | — |
| | W | — | — | 5 | — | — | — |
| | Si | — | — | — | — | — | — |
| | Nb | — | — | 1 | — | — | — |
| | Zr | — | — | 1 | — | 4 | — |
| | Mo | 10 | — | — | — | 2 | — |
| | O | 0.5 | — | — | 1 | — | — |
| | Ti | Bal. | Bal. | Bal. | Bal. | Bal. | Bal. |
| Joining Method | | Friction Welding | Diffusion Welding | Diffusion Welding | Friction Welding | Friction Welding | Friction Welding |
| Joint Strength Ratio | | 1.0 | 1.0 | 1.0 | 1.0 | 1.0 | 1.0 |
| Location of Fracture in Bending Test Piece | | No Fracture | No Fracture | No Fracture | No Fracture | No Fracture | No Fracture |
| Evaluation | | ○ | ○ | ○ | ○ | ○ | ○ |

TABLE 25

| Distinction | | 118 Inventive Example | 119 Inventive Example | 120 Inventive Example | 121 Comparative Example | 122 Comparative Example | 123 Comparative Example |
|---|---|---|---|---|---|---|---|
| Chemical Composition (wt %) | S | 2 | 2 | 2 | 1 | 1 | 1 |
| | REN | 5 | 5 | 5 | 3 | 3 | 3 |
| | Se | 1 | — | — | 1 | 3 | 0.1 |
| | Te | 1 | — | 2 | 1 | — | — |
| | Ca | — | 3 | 1 | 1 | — | 3 |
| | Al | — | — | — | 20 | — | — |
| | V | — | — | — | — | 30 | — |
| | Sn | — | — | — | — | — | 20 |
| | Co | — | — | — | 15 | — | — |
| | Cu | — | — | — | — | — | 15 |
| | Ta | — | — | — | — | — | — |
| | Mn | — | — | — | — | — | — |
| | Hf | 10 | — | — | — | — | — |
| | W | 10 | — | — | — | — | — |
| | Si | 0.5 | — | — | — | — | — |
| | Nb | — | 20 | — | — | — | — |
| | Zr | — | 10 | — | — | — | — |
| | Mo | — | — | 15 | — | — | — |
| | O | — | — | — | — | 2 | — |
| | Ti | Bal. | Bal. | Bal. | Bal. | Bal. | Bal. |
| Joining Method | | Friction Welding | Friction Welding | Friction Welding | Friction Welding | Friction Welding | Friction Welding |
| Joint Strength Ratio | | 1.0 | 1.0 | 1.0 | 1.0 | 1.0 | 1.0 |
| Location of Fracture in Bending Test Piece | | No Fracture | No Fracture | No Fracture | Joint Face | Joint Face | Joint Face |
| Evaluation | | ○ | ○ | ○ | Δ | Δ | Δ |

TABLE 26

| Distinction | | 124 Comparative Example | 125 Comparative Example | 126 Comparative Example | 127 Comparative Example |
|---|---|---|---|---|---|
| Chemical Composition (wt %) | S | 3 | 3 | 3 | 3 |
| | REM | 5 | 5 | 5 | 5 |
| | Se | 6 | — | 2 | — |
| | Te | — | 3 | 2 | — |
| | Ca | — | 3 | 2 | 5 |
| | Al | — | — | — | — |
| | V | — | — | — | — |
| | Sn | — | — | — | — |
| | Co | — | — | — | — |
| | Cu | — | — | — | — |
| | Ta | 20 | — | — | — |
| | Mn | 15 | — | — | — |
| | Hf | — | 15 | — | — |
| | W | — | 15 | — | — |
| | Si | — | — | 1 | — |
| | Nb | — | — | 23 | — |
| | Zr | — | — | 12 | — |
| | Mo | — | — | — | 20 |
| | O | — | — | — | — |
| | Ti | Bal. | Bal. | Bal. | Bal. |
| Joining Method | | Friction Welding | Friction Welding | Friction Welding | Friction Welding |
| Joint Strength Ratio | | 1.0 | 1.0 | 1.0 | 1.0 |
| Location of Fracture in Bending Test Piece | | Joint Face | Joint Face | Joint Face | Joint Face |
| Evaluation | | Δ | Δ | Δ | Δ |

As shown in Tables 20 to 26, in the inventive example satisfying the chemical composition defined in this invention, a joint strength ratio showed high value respectively, and no test piece was fractured in the bending test in all of the joining methods of TIG welding, friction welding and diffusion welding, therefore good results could be obtained.

As compared with above, in comparative alloy pipe No. 88 which is short of S content and comparative alloy pipe No. 89 which is short of REM content, the bending test pieces were fractured from the fusion lines respectively, and the joint strength ratio was low and the bending test piece was fractured at the joint face in comparative alloy pipe No. 95 which is excessive in S and REM content. The bending test piece of comparative alloy pipe No. 96 which is insufficient in S, Se and REM content was fractured at the fusion line, the joint strength ratios were low and the respective bending test pieces were fractured from the joint faces in comparative alloy pipes Nos. 104 and 105 of which total sum of S, Se and Te exceeds 10%, and the bending test pieces were fractured from the fusion lines respectively in comparative alloy pipes Nos. 106 and 107 which are insufficient in S, Se, Te, REM and Ca content. Furthermore, in comparative alloy pipes Nos. 121 to 127 which are excessive in Al, V, Sn, Co, Cu, Ta, Mn, Hf, W, Si, Nb, Zr or Mo content, the bending test pieces were fractured from joint faces.

Examples 128~136

Titanium alloy pipes having various wall thicknesses were manufactured through hot-extruding at a temperature of 1000° C. using titanium alloys having composition shown in Table 27 and Table 28 with mandrels having various diameters, and the titanium alloy pipes were joined with each other through TIG welding, friction welding and diffusion welding under the respective conditions shown in Tables 1 to 3. Subsequently, obtained welded joints were subjected to tensile test and bending test, and evaluated by comparing with the specific value of the respective titanium alloy base metals. The results are shown together in Tables 27 and 28.

TABLE 27

| Distinction | | 128 Comparative Example | 129 Comparative Example | 130 Inventive Example | 131 Inventive Example | 132 Inventive Example | 133 Inventive Example |
|---|---|---|---|---|---|---|---|
| Chemical Composition (wt %) | S | 0.1 | 0.2 | 0.01 | 0.1 | 2 | 5 |
| | REM | — | 1.0 | 0.01 | 0.3 | 5 | 8 |
| | Se | 0.1 | 0.1 | — | 0.1 | — | 2 |
| | Te | — | 0.1 | — | 0.1 | 1 | — |
| | Ca | — | 0.4 | — | 0.1 | 2 | 1 |
| | Al | 6 | 6 | — | 6 | 4 | 10 |
| | V | 4 | 4 | — | 4 | 22 | 20 |
| | Sn | — | — | — | — | 3 | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | O | — | — | — | — | — | — |
| | Ti | Bal. | Bal. | Bal. | Bal. | Bal. | Bal. |
| Manufacturing Method for Pipe | | Extruding | Extruding | TIG Welding | Extruding | Extruding | Extruding |
| t/D | | 0.2 | 0.005 | 0.01 | 0.1 | 0.2 | 0.3 |
| Joining Method | | TIG Welding | TIG Welding | TIG Welding | Friction Welding | Friction Welding | Diffusion Welding |
| Joint Strength Ratio | | 1.0 | 1.0 | 1.0 | 1.0 | 1.0 | 1.0 |
| Location of Fracture in Bending Test Piece | | Fused line | Fused line | No Fracture | No Fracture | No Fracture | No Fracture |
| Evaluation | | Δ | Δ | ○ | ○ | ○ | ○ |

TABLE 28

| Distinction | | 134 Inventive Example | 135 Comparative Example | 136 Comparative Example |
|---|---|---|---|---|
| Chemical Composition (wt %) | S | 5 | 5 | 15 |
| | REM | 7 | 7 | 15 |
| | Se | 2 | 2 | — |
| | Te | 1 | 1 | — |
| | Ca | 3 | 3 | — |
| | Al | 4 | 4 | 6 |
| | V | 22 | 22 | 4 |
| | Sn | 4 | 4 | — |
| | Co | — | — | — |
| | Cu | — | — | — |
| | Ta | — | — | — |
| | Mn | — | — | — |
| | Hf | — | — | — |
| | W | — | — | — |
| | Si | — | — | — |
| | Nb | — | — | — |
| | Zr | — | — | — |

TABLE 28-continued

| | No. | | |
|---|---|---|---|
| | 134 | 135 | 136 |
| Distinction | Inventive Example | Comparative Example | Comparative Example |
| Mo | — | — | — |
| O | — | — | — |
| Ti | Bal. | Bal. | Bal. |
| Manufacturing Method for Pipe | Extruding | Extruding | Extruding |
| t/D | 0.4 | 0.45 | 0.2 |
| Joining Method | Diffusion Welding | Diffusion Welding | Diffusion Welding |
| Joint Strength Ratio | 1.0 | 1.0 | 1.0 |
| Location of Fracture in Bending Test Piece | No Fracture | Joint Face | Joint Face |
| Evaluation | ○ | x | x |

Examples 137~145

Titanium alloy blocks (100 mm in diameter) having compositions shown in Table 29 and Table 30 were coated with vitreous lubricants on the surfaces thereof and subjected to hot-extruding at a temperature between 880 and 1250° C. using mandrels having various diameters to manufacture the titanium alloy pipes having various wall thicknesses, and the titanium alloy pipes were jointed with each other through TIG welding, friction welding and diffusion welding under the respective conditions as shown in Tables 1 to 3. The obtained joints were subjected to tensile test and bending test, and evaluated by comparing with the specific value of the respective titanium alloy base metals. The obtained results are shown together in Tables 29 and 30.

TABLE 29

| | | No. | | | | | |
|---|---|---|---|---|---|---|---|
| | | 137 | 138 | 139 | 140 | 141 | 142 |
| Distinction | | Comparative Example | Comparative Example | Inventive Example | Inventive Example | Inventive Example | Inventive Example |
| Chemical | S | 0.01 | — | 0.01 | 2 | 5 | 7 |
| Composition | REM | 0.01 | — | 0.01 | 5 | 7 | 10 |
| (wt %) | Se | — | 0.01 | — | 1 | 2 | — |
| | Te | — | — | — | 1 | 2 | 3 |
| | Ca | — | 0.01 | — | 3 | 2 | — |
| | Al | 6 | 6 | 6 | 4 | 6 | 10 |
| | V | 4 | 4 | 4 | 22 | 4 | 20 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Extruding Temperature (° C.) | | 880 | 900 | 900 | 1050 | 1100 | 1100 |
| t/D | | 0.4 | 0.5 | 0.4 | 0.4 | 0.3 | 0.2 |
| Joining Method | | TIG Welding | TIG Welding | TIG Welding | Diffusion Welding | Diffusion Welding | Diffusion Welding |
| Joint Strength Ratio | | 0.95 | 0.98 | 1.0 | 1.0 | 1.0 | 1.0 |
| Location of Fracture in Bending Test Piece | | Base Metal | Fused line | No Fracture | No Fracture | No Fracture | No Fracture |
| Evaluation | | X | X | ○ | ○ | ○ | ○ |

TABLE 30

| Distinction | | 143 Inventive Example | 144 Comparative Example | 145 Comparative Example |
|---|---|---|---|---|
| Chemical Composition (wt %) | S | 10 | 10 | 10 |
| | REM | 10 | 10 | 10 |
| | Se | — | — | 5 |
| | Te | — | — | 1 |
| | Ca | — | — | 3 |
| | Al | 10 | 10 | 8 |
| | V | 20 | 20 | 10 |
| | Sn | — | — | — |
| | Co | — | — | — |
| | Cu | — | — | — |
| | Ta | — | — | — |
| | Mn | — | — | — |
| | Hf | — | — | — |
| | W | — | — | — |
| | Si | — | — | — |
| | Nb | — | — | — |
| | Zr | — | — | — |
| | Mo | — | — | — |
| | O | — | — | — |
| | Ti | Bal. | Bal. | Bal. |
| Extruding Temperature (° C.) | | 1150 | 1200 | 1250 |
| t/D | | 0.01 | 0.01 | 0.1 |
| Joining Method | | TIG Welding | Friction Welding | Friction Welding |
| Joint Strength Ratio | | 1.0 | 1.0 | 1.0 |
| Location of Fracture in Bending Test Piece | | No Fracture | Joint Face | Joint Face |
| Evaluation | | ○ | Δ | Δ |

Examples 146~155

Titanium alloy pipes with outer diameter of 100 mm, inner diameter of 80 mm and wall thickness of 10 mm were manufactured through hot-extruding at a temperature of 1000° C. using titanium alloy blocks having compositions shown in Table 31 and Table 32, and the titanium alloy pipes were joined in a vacuum after inserting either alloy A (Ti—40Zr—15Cu—10Ni, melting point: 830° C.) or alloy B (Ti—35Zr—15Cu—15Ni, melting point: 820° C.) in a form of evaporation layer, sheet or powder between joint faces of the respective alloy pipes. Subsequently, the obtained joints were subjected to tensile test and evaluated by comparing with the specific value of the respective alloy base metals. The results are shown together in Tables 31 and 32.

In this case, the evaporation layer (joint layer) or the sheet (joint metal) were arranged as shown in FIG. 1. In FIG. 1, numerals 1 and 3 indicated the titanium alloy pipes, numeral 10 indicates the joint layer or the joint metal and numeral 11 indicates the joint member.

Additionally, high-frequency induction heating at 20 kHz was used for heating in a vacuum, and the pipes were applied with welding pressure of 10 MPa after being held at joining temperature for 300 sec.

TABLE 31

Figure 1B:
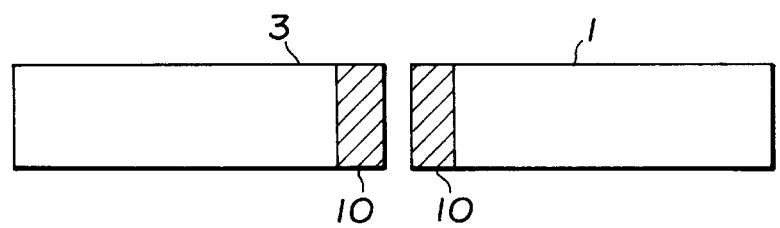
Figure 1C:
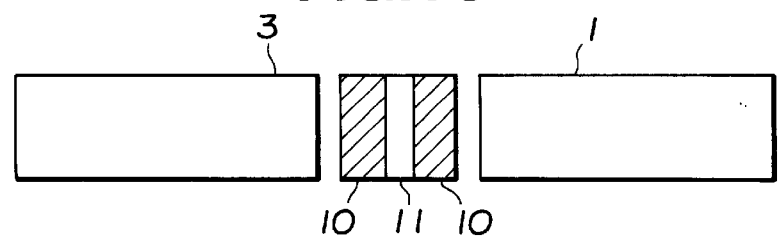
Figure 1D:
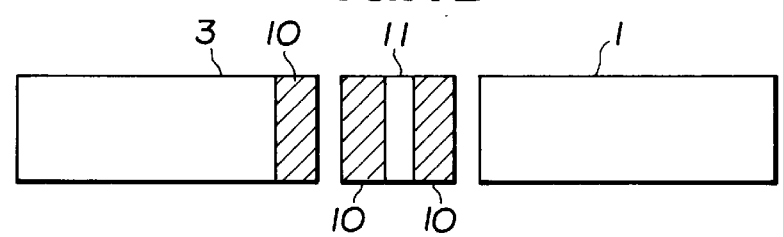
Figure 1E:
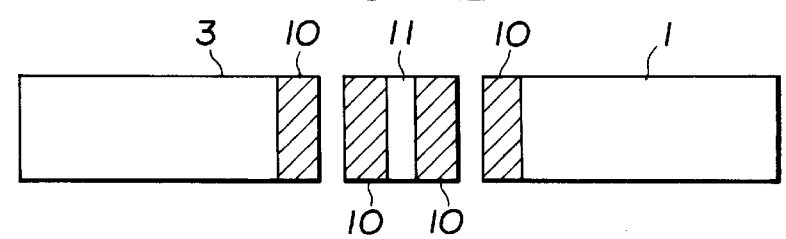

| Distinction | | 146 Comparative Example | 147 Comparative Example | 148 Inventive Example | 149 Inventive Example | 150 Inventive Example | 151 Inventive Example |
|---|---|---|---|---|---|---|---|
| Chemical Composition (wt %) | S | — | 0.005 | 0.1 | 2 | 5 | — |
| | REM | — | 0.005 | 0.1 | 5 | 7 | 4 |
| | Se | — | — | — | 1 | 2 | 5 |
| | Te | — | — | — | 1 | 2 | 5 |
| | Ca | — | — | — | 3 | 2 | 6 |
| | Al | 6 | 6 | 6 | 4 | 6 | 6 |
| | V | 4 | 4 | 4 | 22 | 4 | 4 |
| | Sn | — | — | — | — | — | — |
| | Co | — | — | — | — | — | — |
| | Cu | — | — | — | — | — | — |
| | Ta | — | — | — | — | — | — |
| | Mn | — | — | — | — | — | — |
| | Hf | — | — | — | — | — | — |
| | W | — | — | — | — | — | — |
| | Si | — | — | — | — | — | — |
| | Nb | — | — | — | — | — | — |
| | Zr | — | — | — | — | — | — |
| | Mo | — | — | — | — | — | — |
| | O | — | — | — | — | — | — |
| | Ti | Bal. | Bal. | Bal. | Bal. | Bal. | Bal. |
| Joint Layer or Metal | Alloy | A | A | A | B | B | A |
| | Thickness (μm) | 10 | 20 | 20 | 30 | 40 | 50 |
| | Arrangement | FIG. 1A | FIG. 1B | FIG. 1C | FIG. 1D | FIG. 1E | FIG. 1E |
| Joining Temperature (° C.) | | 900 | 800 | 850 | 950 | 900 | 930 |
| Joint Strength Ratio | | 0.8* | 0.6 | 1.0 | 1.0 | 1.0 | 1.0 |

TABLE 31-continued

|  | No. | | | | | |
| --- | --- | --- | --- | --- | --- | --- |
| Distinction | 146 Comparative Example | 147 Comparative Example | 148 Inventive Example | 149 Inventive Example | 150 Inventive Example | 151 Inventive Example |
| Location of Fracture | Base Metal | Joint Face | Base Metal | Base Metal | Base Metal | Base Metal |
| Evaluation | X | X | ○ | ○ | ○ | ○ |

Remarks
*fractured from crack existing on the surface of pipe

TABLE 32

|  |  | No. | | | |
| --- | --- | --- | --- | --- | --- |
| Distinction | | 152 Inventive Example | 153 Inventive Example | 154 Comparative Example | 155 Comparative Example |
| Chemical Composition (wt %) | S | — | — | 5 | — |
|  | REM | 4 | 4 | 10 | 4 |
|  | Se | 5 | 5 | 5 | 5 |
|  | Te | 5 | 5 | 5 | 5 |
|  | Ca | 6 | 6 | 5 | 10 |
|  | Al | 6 | 6 | 6 | 6 |
|  | V | 4 | 4 | 4 | 4 |
|  | Sn | — | — | — | — |
|  | Co | — | — | — | — |
|  | Cu | — | — | — | — |
|  | Ta | — | — | — | — |
|  | Mn | — | — | — | — |
|  | Hf | — | — | — | — |
|  | W | — | — | — | — |
|  | Si | — | — | — | — |
|  | Nb | — | — | — | — |
|  | Zr | — | — | — | — |
|  | Mo | — | — | — | — |
|  | O | — | — | — | — |
|  | Ti | Bal. | Bal. | Bal. | Bal. |
| Joint Layer or Metal | Alloy | A | B | B | A |
|  | Thickness (μm) | 1 | 100 | 20 | 0.5 |
|  | Arrangement | FIG. 1B | FIG. 1A | FIG. 1A | FIG. 1A |
| Joining Temperature (° C.) | | 840 | 940 | 900 | 900 |
| Joint Strength Ratio | | 1.0 | 1.0 | 0.8 | 0.8 |
| Location of Fraction | | Base Metal | Base Metal | Joint Face | Joint Face |
| Evaluation | | ○ | ○ | x | x |

Examples 156~161

Titanium alloy pipes with outer diameter of 100 mm, inner diameter of 80 mm and wall thickness of 10 mm were manufactured through hot-extruding at a temperature of 1000° C. using titanium alloy blocks having compositions shown in Table 33. The titanium alloy pipes were formed with joint layers with compositions shown in the table on the joint faces of the respective pipes, and joined with each other at different temperatures. Subsequently, the obtained joints were subjected to tensile test and evaluated by comparing with the specific value of the respective alloy base metals. The results are shown together in Table 33.

In this case, the pipes were applied with welding pressure of 10 MPa after being held at joining temperature for 300 sec in a vacuum.

TABLE 33

| | | No. | | | | | |
| --- | --- | --- | --- | --- | --- | --- | --- |
| Distinction | | 156 Comparative Example | 157 Inventive Example | 158 Inventive Example | 159 Inventive Example | 160 Inventive Example | 161 Comparative Example |
| Base Metal | | No. 148 | No. 148 | No. 150 | No. 151 | No. 153 | No. 154 |
| Composition of Joint Layer (wt %) | Ti | 30 | 20 | 35 | 35 | 50 | 50 |
|  | Zr | 10 | 20 | 35 | 35 | 40 | 45 |
|  | Cu | 50 | 59 | 15 | 15 | 9 | 5 |
|  | Ni | 10 | 1 | 15 | 15 | 1 | 0 |
| Thickness (μm) | | 5 | 5 | 10 | 10 | 20 | 20 |

TABLE 33-continued

| Distinction | 156 Comparative Example | 157 Inventive Example | 158 Inventive Example | 159 Inventive Example | 160 Inventive Example | 161 Comparative Example |
|---|---|---|---|---|---|---|
| Melting Point (° C.) | 730 | 780 | 820 | 820 | 1030 | 1050 |
| Arrangement | FIG. 1B | FIG. 1B | FIG. 1C | FIG. 1C | FIG. 1D | FIG. 1D |
| Joining Temperature (° C.) | 900 | 900 | 900 | 900 | 1100 | 1100 |
| Joint Strength Ratio | 0.6 | 1.0 | 1.0 | 1.0 | 1.0 | 0.8 |
| Location of Fracture | Joint Face | Base Metal | Base Metal | Base Metal | Base Metal | Joint Face |
| Evaluation | X | ○ | ○ | ○ | ○ | X |

Examples 162~167

Titanium alloy pipes with outer diameter of 100 mm, inner diameter of 80 mm and wall thickness of 10 mm were manufactured through hot-extruding at a temperature of 1000° C. using titanium alloy blocks having compositions shown in Table 34. The titanium alloy pipes were formed with joint layers shown in the table on the joint faces of the respective pipes and joined with each other by high-frequency induction heating of different frequencies. The obtained joint were subjected to tensile test and evaluated by comparing with the specific value of the respective titanium alloy base metals. The results are shown together in Table 34.

In this case, the pipes were applied with welding pressure of 10 MPa after being held at joining temperature for 300 sec in a vacuum.

Examples 168~173

Titanium alloy pipes with outer diameter of 100 mm, inner diameter of 80 mm and wall thickness of 10 mm were manufactured through hot-extruding at a temperature of 1000° C. using titanium alloy blocks having compositions shown in Table 35. The titanium alloy pipes were joined with each other changing the joining atmosphere, and the obtained joints were subjected to tensile test and evaluated by comparing with specific value of the respective titanium alloy base metals. The results are shown together in Table 35.

In this case, the pipes were heated for 300 sec. through high-frequency induction heating at frequency of 20 kHz and applied with welding pressure of 10 MPa.

TABLE 34

| Distinction | 162 Comparative Example | 163 Comparative Example | 164 Inventive Example | 165 Inventive Example | 166 Inventive Example | 167 Inventive Example |
|---|---|---|---|---|---|---|
| Base Metal | No. 147 | No. 148 | No. 149 | No. 150 | No. 151 | No. 153 |
| Joint Composition | No. 157 | No. 157 | No. 157 | No. 158 | No. 159 | No. 160 |
| Layer Thickness (μm) | 5 | 5 | 10 | 15 | 20 | 30 |
| Arrangement | FIG. 1A | FIG. 1A | FIG. 1D | FIG. 1C | FIG. 1D | FIG. 1E |
| Frequency (kHz) | 400 | 400 | 200 | 100 | 25 | 3 |
| Joining Temperature (° C.) | 900 | 900 | 900 | 900 | 900 | 1100 |
| Joint Strength Ratio | 0.8 | 0.9 | 1.0 | 1.0 | 1.0 | 1.0 |
| Location of Fracture | Joint Face | Joint Face | Base Metal | Base Metal | Base Metal | Base Metal |
| Evaluation | X | X | ○ | ○ | ○ | ○ |

TABLE 35

| Distinction | No. 168 Comparative Example | No. 169 Inventive Example | No. 170 Inventive Example | No. 171 Inventive Example | No. 172 Inventive Example | No. 173 Comparative Example |
|---|---|---|---|---|---|---|
| Base Metal | No. 148 | No. 148 | No. 149 | No. 150 | No. 151 | No. 153 |
| Joint Composition | No. 157 | No. 157 | No. 158 | No. 159 | No. 160 | No. 157 |
| Layer Thickness (μm) | 10 | 10 | 20 | 20 | 20 | 20 |
| Arrangement | FIG. 1B | FIG. 1B | FIG. 1C | FIG. 1D | FIG. 1E | FIG. 1E |
| Joining Temperature (° C.) | 900 | 900 | 900 | 900 | 1100 | 900 |
| Atmosphere gas | Ar | Ar | He | Vacuum | Ar | Ar |
| O₂ (vol %) | 0.1 | 0.01 | 0.005 | — | 0.005 | 0.01 |
| N₂ (vol %) | 0.1 | 0.01 | 0.01 | — | 0.005 | 0.10 |
| Joint Strength Ratio | 0.9 | 1.0 | 1.0 | 1.0 | 1.0 | 0.9 |
| Location of Fracture | Joint Face | Base Metal | Base Metal | Base Metal | Base Metal | Joint Face |
| Evaluation | X | ◯ | ◯ | ◯ | ◯ | X |

Examples 174~178

Titanium alloy pipes with outer diameter of 100 mm, inner diameter of 80 mm and wall thickness of 10 mm were manufactured through hot-extruding at a temperature of 1000° C. using titanium alloy blocks having compositions shown in Table 36. The titanium alloy pipes were jointed with each other under the similar conditions shown in Table 35 after forming inclined planes at ends of the respective pipes. Subsequently, the welded joints were subjected to tensile test and evaluated by comparing with the specific value of the respective titanium alloy base metals. The results are shown together in Table 36.

Additionally, in FIG. 2, numerals 1 and 3 indicate the titanium alloy pipes, numeral 10 indicates the joint layer or joint metal, and numeral 11 indicates the joint member.

to 10 wt % of Te within a range of not exceeding 10 wt % in the total sum of S, Se and Te, and one or both of 0.01 to 10 wt % of REM and 0.01 to 10 wt % of Ca within a range of not exceeding 10 wt % in the total sum of REM and Ca, an excellent effect can be obtained since the coarsening of the crystal grain at a temperature higher than α- βtransition temperature is inhibited and it is possible to prevent the mechanical properties from the deterioration caused by welding or hot-extrusion. The titanium alloy or the titanium alloy pipe according to this invention can be improved in the strength by further containing one or more of Al, V, Sn, Co, Cu, Ta, Mn, Hf, W, Si, Nb, Zr, Mo and O in the predetermined range.

In the method for producing the titanium alloy pipe according to this invention, the titanium alloy material having the aforementioned chemical composition is

TABLE 36

Figure 2A:
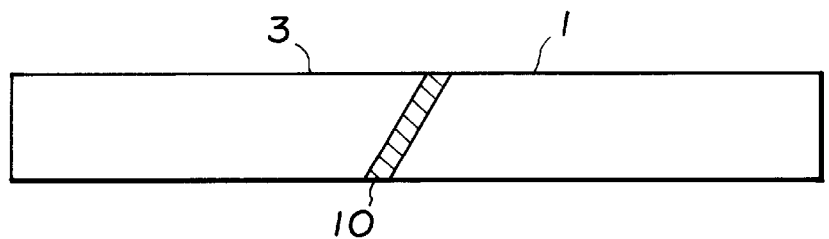
FIGS. 2A, 2B, 2C, and 2D are schematic illustrations showing arrangement of the joint metal, joint layer and joint member for joining the titanium alloy pipes by inclining joint faces of the pipes in the other examples of this invention.
Figure 2B:
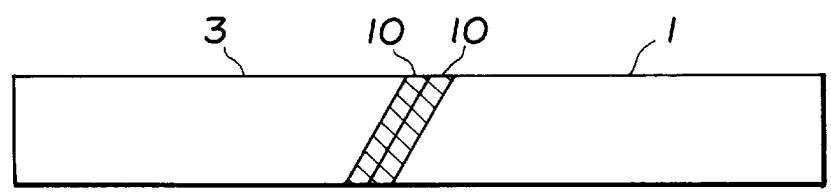
Figure 2C:
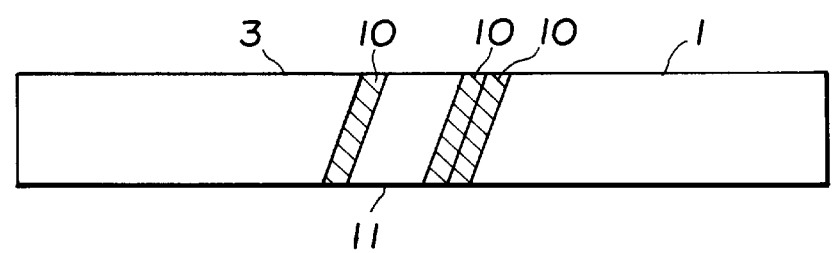
Figure 2D:
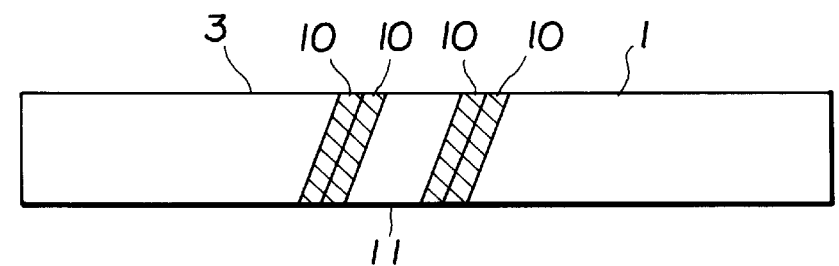

| Distinction | No. 174 Inventive Example | No. 175 Inventive Example | No. 176 Inventive Example | No. 177 Inventive Example | No. 178 Inventive Example |
|---|---|---|---|---|---|
| Combination of Joining Conditions | No. 169 | No. 169 | No. 170 | No. 171 | No. 172 |
| Arrangement | FIG. 1A | FIG. 2A | FIG. 2B | FIG. 2C | FIG. 2D |
| Joint Strength Ratio | 1.0 | 1.0 | 1.0 | 1.0 | 1.0 |
| Location of Fracture | Base Metal | Base Metal | Base Metal | Base Metal | Base Metal |
| Bending Test | ◯ | ◎ | ◎ | ◎ | ◎ |
| Evaluation | ◯ | ◎ | ◎ | ◎ | ◎ |

Figure 3:
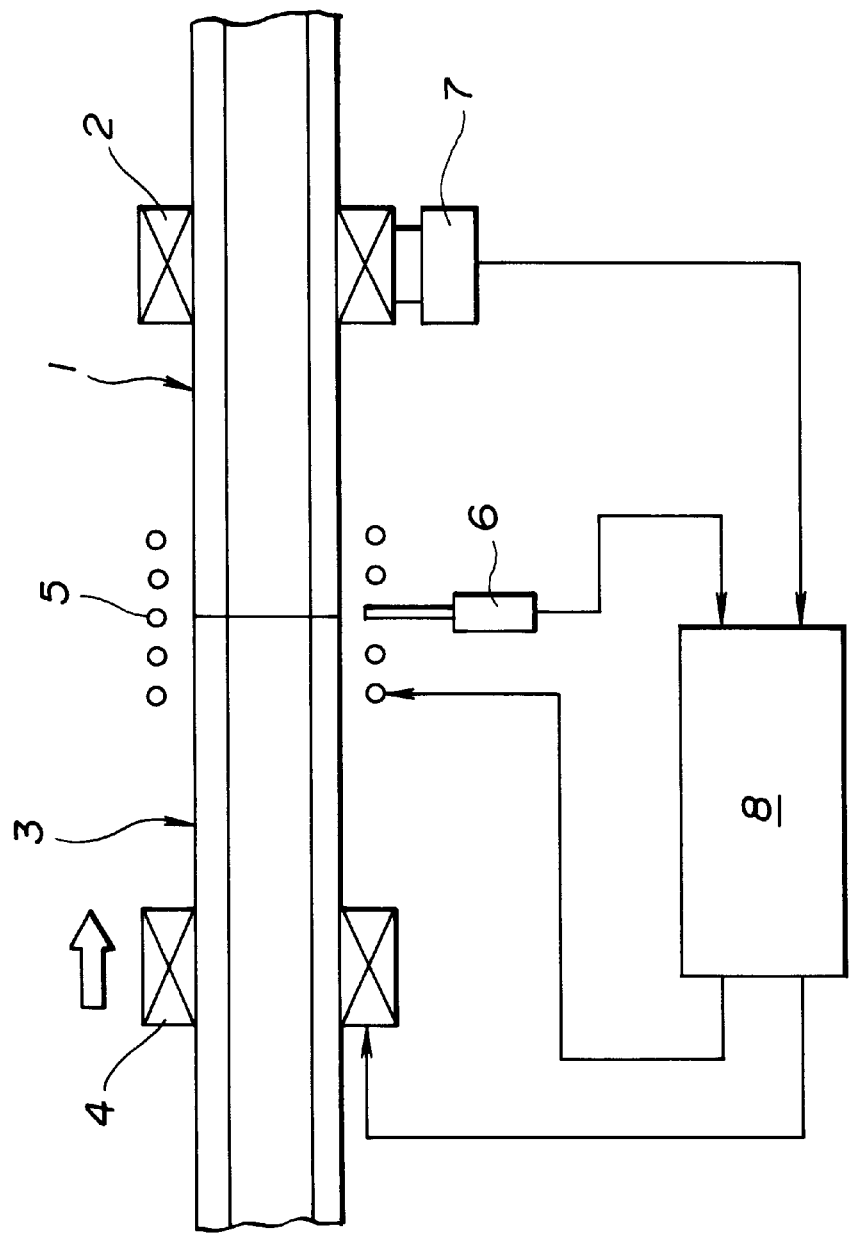
FIG. 3 is a schematic illustration showing an example of the joining apparatus to be used in examples of this invention.

An example of the joining apparatus for execution of this invention is shown in FIG. 3.

In the joining apparatus shown in FIG. 3, numerals 1 and 3 are the titanium alloy pipes, numerals 2 and 4 are fixed and movable chucks as a pressing means, numeral 5 is an induction coil as a heating means, numeral 6 is a radiation thermometer as a temperature measuring means, numeral 7 is a pressure gauge as a pressure measuring means and numeral 8 is a controller as a control means.

As mentioned above, in the titanium alloy or the titanium alloy pipe according to this invention, which contains one or more of 0.01 to 10 wt % of S, 0.01 to 10 wt % of Se and 0.01 extruded into a seamless tubular shape. Therefore, wastage of the extruding die can be reduced and it is possible to provide titanium alloy pipes having good surface quality and excellent in the flattening test property and possible to especially provide thick-walled titanium alloy pipes applicable to the large-sized structures.

In an embodiment of the method for producing the titanium alloy pipe according to this invention, it is possible to produce the thick-walled titanium alloy pipes without applying excessive pressure by extruding the titanium alloy material into the tubular shape so that the ratio (t/D) of thickness (t) to outer diameter (D) of the pipe may be in a range of 0.01 to 0.4. Further in the other embodiment of the method for producing the titanium alloy pipe according to this invention, it is possible to reduce deformation resistance at the time of hot-extruding and possible to produce the seamless titanium alloy pipes without coarsening of crystal grain by extruding the titanium alloy material at a temperature range of 900° C. to 1150° C.

In the joined tubular body according to this invention and formed by joining the titanium alloy pipes having the aforementioned chemical compositions with each other, it is possible to improve the quality of the welded joint even in the welding at the job site, and possible to provide large-scaled and thick-walled joined tubular bodies applicable to the large-sized structures.

In the method for producing the joined tubular body according to this invention, and comprising the steps of forming the joint layer of which melting point ($M_J$) is lower than melting point ($M_M$) of titanium alloy pipes to be joined on one or both joint faces of the pipes, and/or inserting the joint metal or the joint member between the joint faces, the joint metal having melting point ($M_J$) lower than melting point ($M_M$) of the pipes and the joint member being previously formed with joint layers of which melting point ($M_J$) is lower than melting point ($M_M$) of the pipes on both ends thereof, and joining the pipes by heating the pipes at a temperature (T) higher than ($M_J$) and lower than ($M_M$) and holding the pipes at the temperature (T) for a predetermined period at the same time of applying pressure on the joint faces of the pipes, it is possible to join the pipes securely with each other even in the welding at the job site, and possible to produce the joined tubular body applicable to the large-sized structures.

What is claimed is:

1. A joined tubular body characterized in that a titanium alloy pipe having a composition consisting essentially by weight percentage of not more than 10% in total sum of at least one element selected from the group consisting of 0.01 to 10% of S, 0.01 to 10% of Se and 0.01 to 10% of Te, not more than 10% in total sum of one or both of 0.01 to 10% of REM and 0.01 to 10% of Ca, and the remainder being substantially Ti and the titanium alloy pipe having a composition consisting essentially by weight percentage of not more than 10% in total sum of at least one element selected from the group consisting of 0.01 to 10% of S, 0.01 to 10% of Se and 0.01 to 10% of Te, not more than 10% in total sum of one or both of 0.01 to 10% of REM and 0.01 to 10% of Ca, not more than 30% in total sum of at least one element selected from the group consisting of not more than 10% of Al, not more than 25% of V, not more than 15% of Sn, not more than 10% of Co, not more than 10% of Cu, not more than 15% of Ta, not more than 10% of Mn, not more than 10% of Hf, not more than 10% of W, not more than 0.5% of Si, not more than 20% of Nb, not more than 10% of Zr, not more than 15% of Mo and not more than 0.1% of O, and the remainder being substantially Ti are joined to each other.

2. A joined tubular body as set forth in claim 1, wherein said pipes are seamless.

3. A joined tubular body as set forth in claim 1, wherein a ratio (t/D) of thickness (t) to outer diameter (D) of each of pipes is not less than 0.01 and not more than 0.40.

4. A joined tubular body as set forth in claim 2, wherein a ratio (t/D) of thickness (t) to outer diameter (D) of each of pipes is not less than 0.01 and not more than 0.40.

* * * * *

UNITED STATES PATENT AND TRADEMARK OFFICE
CERTIFICATE OF CORRECTION

PATENT NO. : 6,007,923
DATED : December 28, 1999
INVENTOR(S) : Shimizu et al.

It is certified that error appears in the above-identified patent and that said Letters Patent is hereby corrected as shown below:

Column 40, line 9, change "the" to --a--.

Signed and Sealed this

First Day of August, 2000

Q. TODD DICKINSON

*Attest:*

*Attesting Officer*  *Director of Patents and Trademarks*